2 Sheets--Sheet 1.

T. S. DICKERSON.

Manufacture and Application of Gas from Petroleum, &c

No. 5,327. Reissued March 18, 1873.

Witnesses:
J. M. Tebbetts.
Jas. H. Blunt

Inventor:
Thomas S. Dickerson.

2 Sheets--Sheet 2.

T. S. DICKERSON.

Manufacture and Application of Gas from Petroleum, &c.

No. 5,327. Reissued March 18, 1873.

Witnesses:
J. M. Tebbetts.
Jas. G. Blunt

Inventor:
Thomas S. Dickerson.

UNITED STATES PATENT OFFICE.

THOMAS S. DICKERSON, OF CHICAGO, ILLINOIS, ASSIGNOR TO HIMSELF AND RODNEY M. WHIPPLE, OF SAME PLACE.

IMPROVEMENT IN THE MANUFACTURE AND APPLICATION OF GAS FROM PETROLEUM, &c.

Specification forming part of Letters Patent No. 95,665, dated October 12, 1869; reissue No. 5,327, dated March 18, 1873.

*To all whom it may concern:*

Be it known that I, THOMAS S. DICKERSON, of the city of Chicago, in the county of Cook and State of Illinois, have invented a new and Improved Mode of Manufacturing and Generating Gas from Petroleum and other oleaginous substances, the same being a new and useful machine for the purpose aforesaid; and I hereby declare that the following is a full, clear, and exact description of the same, reference being had to the accompanying drawing forming a part of this specification, in which—

Figure 1:
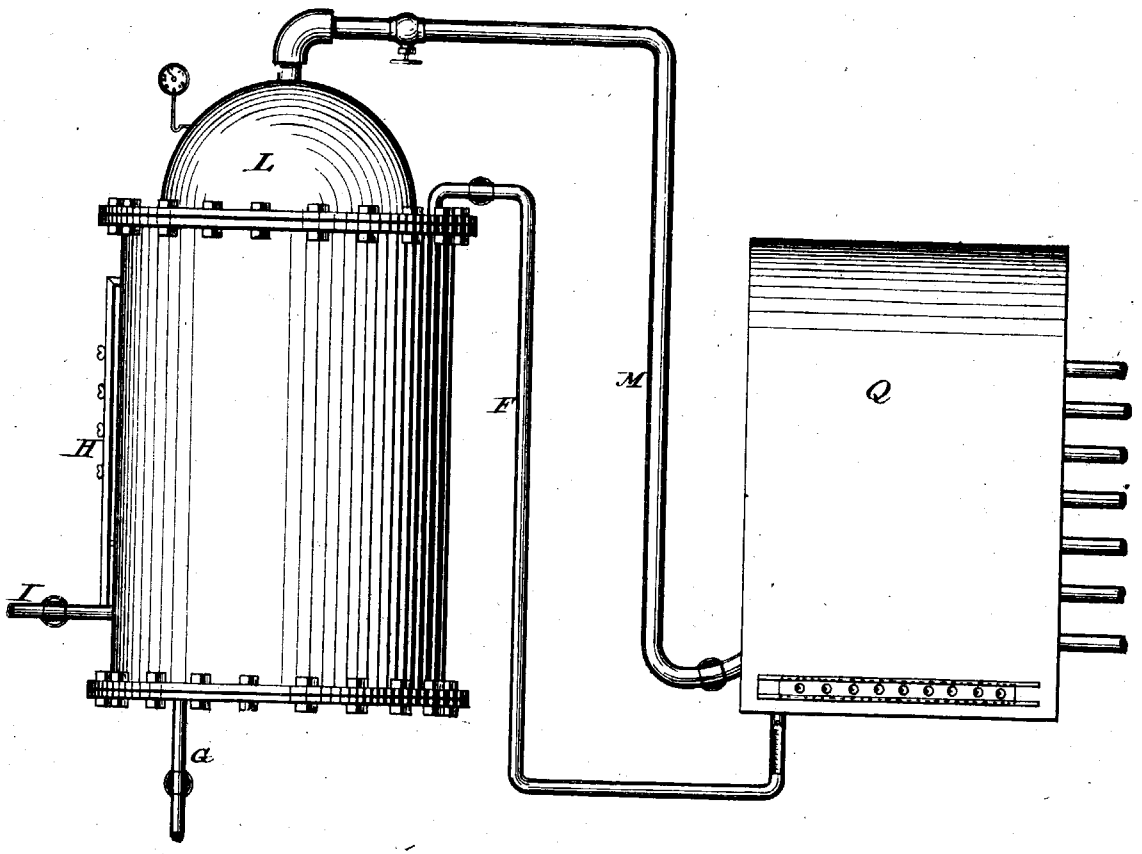
Figure 2:
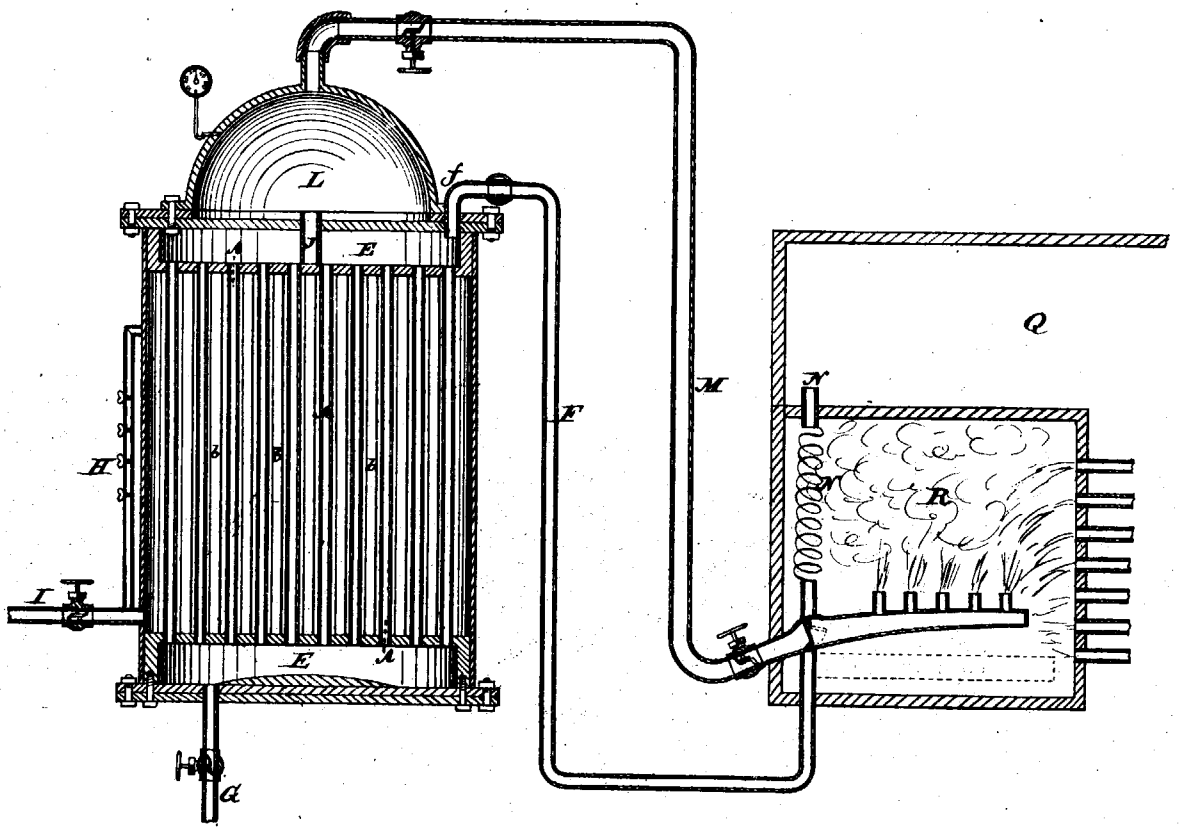

Figure 1 represents an elevation of the invention, showing external of gas-generator and its connections. Fig. 2 represents a sectional view of generator, fire-box, gas-burners, and connections, taken in line of center.

Similar letters of reference in the several figures indicate corresponding parts.

The nature of my invention consists in producing gas from crude or refined petroleum or other oleaginous substances by means of superheated steam operating in the manner hereinafter described.

I am aware that many attempts have been made to use petroleum for generating steam, and for producing heat and light, and its large heat-producing power especially recommends it; but the difficulties heretofore met with from the deposits of carbon and consequent filling up of the pipes, and also in obtaining it in a manageable form, have prevented its use. By the application of superheated steam to form the gas I prevent the deposition of carbon, and by first producing gas before burning I avoid the difficulties where the liquid is introduced directly into the fire-box or furnace.

The machine is simple in its construction, and the result almost beyond comprehension.

To enable others skilled in the art to make and use my invention, I will proceed to describe its construction and mode of operation.

The generator for producing the gas is composed of a cylinder made of boiler-iron, with cast-iron heads, to which the cylinder is riveted. The heads are cast with a hollow or steam space, and connected with each other, through the cylinder, by tubes, as shown by letters A A. The space in the cylinder around the tubes, as shown by letters *b b*, is filled with oil. The gas escapes through the head of the cylinder into the dome by an opening, as shown by letter J. Letters E E represent the steam-space at each end of the cylinder, which it will be seen allows a complete circulation of the steam. Letter F represents the steam-pipe coming from the boiler. Letter *f* represents the steam-pipe leading into the steam-space E, with suitable stop-cocks. Letter G represents the escape-pipe from the steam-space E for carrying off the condensed steam. Letter H represents the oil-gage, by which the amount of oil in the generator can be ascertained at any time. Letter I represents the pipe to feed the machine with oil. Letter J represents the pipe or opening from the oil-space to the dome above. Letter M represents the gas or vapor pipe leading from the machine to the fire-chamber, which is provided with suitable stop-cocks, and also a check-valve which only opens with the pressure of the gas, and closes when the pressure is removed. Letter R represents the fire-box and burners, showing one way of consuming the gas for fuel. Letter N represents the coil in the fire-box by which the steam is superheated.

The mode of operating the machine is as follows: Steam is taken from the boiler, which passes down through the fire-box R and through the steam-coil N into the main steam-pipe marked F. From thence it is let into the steam-space E E, which fills the tubes in the cylinder, which heats the oil in the cylinder, which immediately passes off into gas or vapor through the opening J into the dome, where it passes from its own pressure into the tube leading to the fire-chamber. Suitable stop-cocks and valves should be placed between all of the connections, which should always be under the control of the engineer.

I do not claim generating gas from petroleum by passing steam directly through the oil, as that has been long used to remove the lighter portions from petroleum; nor do I claim to vaporize petroleum by fire heat alone direct to the generator, as that produces carbonization in the pipes and a clogging up of the apparatus; nor do I claim a series of tubes to carry off the gas or vapor from the oil-space to the dome. One single opening, such as is used in stills or gas-retorts, is all that I use. Any ordinary opening to pass off the vapor or gas is all that is required, and is easily constructed, as the distance across the steam-space in the largest machines will not exceed two and one-half inches.

Having thus described my invention, what I claim as new, and wish to secure by Letters Patent, is—

1. The generator, composed of steam-space E E, tubes A A, oil-space *b b*, steam-pipe F, when used for the manufacture of gas from petroleum and any other oleaginous substance, substantially as shown, and for the purpose set forth.

2. The combination of the generator and dome.

3. The use and application of petroleum or other oleaginous substance for generating steam and for heating and illuminating purposes, by the combination and the process herein described, substantially as shown, and for the purposes set forth.

4. The combination of a steam superheater, a connecting steam-pipe, and a tubular generator, so as to form a gas or vapor apparatus, substantially as described.

5. The tubular generator, composed of a series of tubes connected by the flanged heads at opposite ends, and the whole surrounded by a boiler-plate covering, or its equivalent, substantially as shown, and for the purposes set forth.

THOMAS S. DICKERSON.

Witnesses:
E. B. SHERMAN,
CHARLES E. BYRNE.